United States Patent Office 2,983,758
Patented May 9, 1961

2,983,758

PREPARATION OF AMINES

Fred W. Hoover, Wilmington, Del., assignor to E. I. du Pont de Nemours and Company, Wilmington, Del., a corporation of Delaware No Drawing. Filed Oct. 28, 1955, Ser. No. 543,600

6 Claims. (Cl. 260—578)

This invention relates to the preparation of amines and, more particularly, to an improved process for preparing amines by the action of amino radicals on organic compounds.

Amino compounds are of great economic importance. For example, aromatic amines are important in synthesis of dyestuffs. Of the aliphatic amines, the diamines are used in the preparation of condensation polymers such as nylon. Considerable research has been directed to the preparation of amines. Most synthetic routes to amines require a number of reaction steps. Furthermore, conventional methods generally are not of sufficient versatility to give diamines having ethylenic unsaturation.

Recently, it has been found that amines, and particularly diamines, can be obtained directly from a polymerizable ethylenically unsaturated compound such as butadiene by reaction with amino radicals generated in situ from the action of a metallic reducing ion, e.g., a titanous or vanadous ion, on a hydroxylamino compound, e.g., an N-alkyl (or N-alkaryl) hydroxylamine, in an aqueous medium that usually contains an alcohol, although an ester or ether can be present. Although this prior process represents a very interesting and potentially important scientific advance in the preparation of amines, improved yields would make it more important from a commercial point of view. Furthermore, the process was not found readily applicable for the preparation of amine-containing compounds from non-polymerizable compounds having a carbon-to-carbon double bond, including aromatic hydrocarbons.

An object of the present invention is to provide an improved process for preparing organic amines in higher yields by reacting an organic compound with amino radicals. A further object is to provide such a process which is applicable for the preparation of organic amines from organic compounds having a carbon-to-carbon double bond, in general. Other objects of the invention will become apparent from the specification and claims.

The process of the present invention comprises carrying out the reaction of organic compounds with amino radicals generated in situ by conducting the reaction in an aqueous medium containing, per part of water by weight, 0.5 to 10 parts of formic or acetic acid, or a fluoroacetic or chloroacetic acid. The use of this aqueous medium in generating and reacting the amino radicals with organic compounds results in an unexpected improvement in the yields of organic amines obtained, as well as extension of the scope of the amine-forming reaction to amination of compounds containing carbon-to-carbon double bonds in general, such as aromatic compounds, to which the general method was not applicable previously.

The amino radical is preferably obtained by the action of a metallic reducing ion on a hydroxylamino compound. The presence of some water generally facilitates the preparation and use of amino radicals in a homogeneous system. The amino radicals are very reactive radicals and it is surprising that the addition of added organic acid not only does not react with amino radicals but increases the yield of desired aminated products.

The following examples illustrate specific embodiments of this invention.

Example I

In a flask equipped with a dropping funnel and stirrer was placed 550 ml. of glacial acetic acid, 100 ml. of water, 38.5 g. of hydroxylamine hydrochloride, 125 ml. of benzene and 21 ml. of concentrated hydrochloric acid. After flushing this mixture with nitrogen, 345 ml. of 1.45 molal titanous chloride solution (15–16% Technical Grade) was added with vigorous stirring over a period of about 25 minutes. A temperature of 15–20° C. was maintained through the use of a water bath. This procedure was repeated and the two runs combined for separation of the amines. A 40% solution of aqueous sodium hydroxide was added to raise the pH to about 2.6 whereupon a copious precipitate of hydrated titanium oxide separated. About an equal volume of acetone was added to assist in flocculating the precipitate which was then removed by centrifugation. The centrifugate was concentrated under water pump vacuum. To the resultant concentrated solution was added about 1 liter 40% sodium hydroxide to make the mixture strongly basic. The liberated amines were extracted with ether. Upon removal of the ether from the ether extract there was obtained 27.6 g. of amines having a neutral equivalent of 97.8; this corresponds to a conversion based on the titanium employed of 29.2%. In another experiment the yield was 30.6%.

The product contains a tetrahydrobenzidine along with smaller amounts of aniline and other amines. The tetrahydrobenzidine product decomposed on heating to form ammonia and diphenyl.

Example II

The general procedure of Example I was repeated except that formic acid was used instead of acetic acid: 345 ml. of 1.45 M titanous chloride solution was added portionwise over a period of about 25 minutes to a mixture of 550 ml. of formic acid, 100 ml. of water, 38.5 g. of hydroxylamine hydrochloride, 21 ml. of concentrated hydrochloric acid and 125 ml. of benzene. The titanium was removed by the addition of 40% sodium hydroxide to precipitate the titanium as hydrated titanium oxide. This was removed by centrifugation. The resultant centrifugate was treated with excess sodium hydroxide to raise the pH above 11 and this mixture was then extracted four times with 500-ml. portions of ether. The amines obtained correspond to 18% conversion based on the titanium used.

Example III

The general procedure of Example II was repeated, including the isolation procedure, with the exception that monochloroacetic acid was used as a solvent instead of formic acid. The conversion to amino compounds was 10% based on the titanium used.

Example IV

The general procedure of Example II was repeated except trifluoroacetic acid was used instead of formic acid. The conversion to amines was 7% based on the titanium used.

The superiority of the above reaction systems for the reaction of amino radicals with benzene is illustrated by the fact that markedly lower conversions were obtained in other systems. For example, in water the conversion was 0.1%, in aqueous propionic acid 3%, aqueous acetone 1.3% and aqueous acetonitrile 3%.

Example V

The reaction of butadiene with amino radicals at atmospheric pressure was carried out as follows. To a mixture of 1100 ml. of acetic acid, 200 ml. of water, 77 g. of hydroxylamine hydrochloride and 27 ml. of concentrated sulfuric acid was added 488 g. of 1.4 M vanadic sulfate solution with vigorous stirring over a period of 49 minutes. Concurrently butadiene gas was added to this mixture at the rate of 2 liters/minute. Analysis of an aliquot of the reaction mixture indicated that about 27% of the hydroxylamine had been converted to ammonia. The amines formed were isolated by distilling off most of the acetic acid under reduced pressure and then adding excess 40% sodium hydroxide. The resultant mixture was extracted three times with a total of 4 lbs. of ether and two times with a total of 1.5 liters methylene chloride. After drying the combined extracts over sodium hydroxide, the amines were recovered by distillation through a simple Vigreux-type column. The following fractions were obtained:

| Fraction | Boiling Point (° C./mm.) | Weight (g.) | Neutral Equivalent |
| --- | --- | --- | --- |
| 1 | 86–100/3 | 20.2 | 75.0 |
| 2 | 100–148/3 | 6.5 | 97.5 |
| Residue | | 8.6 | 82.7 |

Redistillation of Fraction 1 shows that this fraction was largely a mixture of eight carbon diamines having a neutral equivalent of 71.0 as compared with a theoretical neutral equivalent of 70. Fraction 2 on redistillation was shown to be a twelve carbon diamine having a neutral equivalent of 97.5. The amino compounds formed in this reaction were as follows: yield of amines 73% (including yield of $C_8$ diamines, 40%, yield of $C_{12}$ diamines 15%, yield of higher boiling amines 18%), and yield of ammonia 27%.

When the acetic acid was not used in the aqueous system or in an aqueous methanol solution and butadiene was added in a manner similar to that described above, much lower conversions of amino compounds were obtained and there was also a lower percentage of distillable eight carbon amines. In neither case was a twelve carbon diamine obtained on distillation.

The acetic acid system has proved to be a particularly desirable one for reacting butadiene with amino radicals because it markedly favors the conversion to amino compounds especially at room temperature under a pressure of one atmosphere of butadiene. Moreover, because of the inertness of acetic acid to amino radicals, less complicated reaction products are obtained than are obtained with reactive solvents such as methanol.

Example VI

Toluene was reacted with amino radicals in an acetic acid medium by procedures similar to that described in Example I. In this experiment 345 ml. of 1.45 M titanous chloride solution was added under nitrogen with stirring to a mixture of 550 ml. of acetic acid, 100 ml. of water, 38.5 g. of hydroxylamine hydrochloride, 125 ml. of toluene and 21 ml. of concentrated hydrochloric acid. Two such runs were carried out and the products combined for isolation of amines, using the procedure described in Example II. There was obtained 31 g. of an oily product having a neutral equivalent of 117. This corresponds to a yield of about 27% based on the titanium used. The product was similar to that obtained from benzene in being unstable to heat. On distillation about 15–20% of this product was found to be toluidine.

Example VII

By the procedure described in Example I, o-xylene was found to react with amino radicals to yield high-boiling amine products in about 12.5% conversion based on the titanium employed.

Example VIII

By the procedure described in Example I, p-xylene was found to react with amino radicals to form high-boiling amines in 5% conversion based on the titanium used.

Example IX

In this experiment 690 ml. of 1.45 M titanous chloride was added over a period of one hour to a stirred mixture of 1100 ml. of acetic acid, 200 ml. of water, 77 g. of hydroxylamine hydrochloride, 42 ml. of concentrated hydrochloric acid and 250 g. of ethylene. An autoclave was used for carrying out this experiment. The temperature of the reaction was about 25° C. and the pressure 325 pounds per square inch gage. The product was isolated by the procedure given in Example II. The yield of amines was about 20% based on the titanium used. These amines consisted of n-butylamine (boiling point, 76.5–78; neutral equivalent, 73.6; melting point of $$C_6H_5NCS$$

derivative, 64° C. compared with 77.8, 73.1 and 64–65° C. for authentic samples) n-hexylamine (M.P. of $$C_6H_5NCS$$

derivative 74.5–75.5 as compared to 74.0–74.5 for an authentic sample, literature 70° C.) and higher-boiling amines.

Example X

Tetramethylethylene was found to react with amino radicals by the procedure described in Example I to give amines in about 15% conversion based on titanium used. The main products were $H_2NC(CH_3)_2CH(CH_3)_2$ and $$H_2NC(CH_3)_2C(CH_3)_2OH$$

identified by comparison with authentic samples.

The preceding examples illustrate that amino compounds can be prepared by the reaction of amino radicals with organic compounds susceptible to amination therewith when the reaction is carried out in aqueous 1–2 carbon alkanoic acid or a halogenated acetic acid wherein the halogen is of atomic number 9 and 17.

The advancement in this field, i.e., the preparation of amino compounds from amino radicals, provided by this invention resides in the use of aqueous 1–2 carbon alkanoic acids and fluoro- or chloroacetic acids. Such a solvent system gives increased yields and extends the scope of the amine-forming reaction, in particular to aromatic compounds. Thus, amine-containing reaction products are obtained when either ethylene or aromatic hydrocarbons are used. In the absence of an acid, no reaction may occur or different products are obtained. Furthermore, when no acid is present, the yields are generally considerably lower.

The preferred acids are formic and acetic in view of their availability, cost, and solubility, and ease of removal from the amines formed.

The presence of water in the reaction medium facilitates in keeping the reaction homogeneous. The ratio of acid to water should be within the range of 10 of organic acid to 1 of water by weight to 1 of acid to 2 of water. Preferably the ratio is from 1 to 2 parts of organic acid per unit weight of water.

The compounds most generally useful for the preparation of amino compounds have carbon-to-carbon double bonds including both open chain and cyclic compounds, i.e., aliphatic, cycloaliphatic and aromatic compounds. The aliphatic compounds that can be employed include ethylene, propylene, isobutylene, butadiene, isoprene and the like. Cycloaliphatic compounds are cyclohexene, cyclopentadiene, methylcyclopentadiene and cyclohexadiene. Compounds that contain aromatic nuclei that are also useful for the preparation of amines with amino radicals are benzene, toluene, xylene, isopropylbenzene and styrene.

Of the above types of compounds those containing from 2–9 carbons are more available and generally used. Compounds that contain conjugated unsaturation, and particularly those which have two conjugated ethylenic groups, react readily to give high yields of diamines containing isolated double bond unsaturation.

In the reaction system of this invention such organic compounds are generally present in a weight ratio of up to 1 part per part of organic acid employed as the solvent. The amount of reactive or reacted organic compound can be less than one part per 20 parts of acid such as acetic acid.

The amino radicals can be produced by various methods. The preferred method is by the action of a metallic reducing ion on a hydroxylamino compound. Suitable metallic reducing ions include $Ti^{+3}$, $V^{+2}$, $V^{+3}$, $Cr^{+2}$ and $Mo^{+3}$. Optimum speed of reaction is attained when the reducing ion is titanous or vanadous. The metallic reducing ion itself may be generated in situ, e.g., titanium ion may be obtained through the reaction of amalgamated zinc on titanic ion. The anion present with the metallic reducing cation is immaterial to the course of the reaction. Anions present generally include the sulfate, chloride, bromide or nitrate.

The hydroxylamino compounds that can be used include hydroxylamine and its acid salts such as the hydrochloride or sulfate; o-acyl derivatives such as hydroxylamine o-sulfonic acid; N-alkyl hydroxylamines (including N-alkaryl hydroxylamines) such as N-ethyl hydroxylamine, N,N-dimethylhydroxylamine and N,N-dibenzylhydroxylamine. The hydroxylamino compounds, including aldoximes and ketoximes, can be represented by the formula

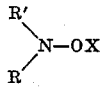

wherein R and R' are hydrogen or hydrocarbon radicals in which any carbon directly attached to the nitrogen is aliphatic including the situation when R and R' together form a divalent organic radical as in acetone ketoxime, cyclohexanone ketoxime and butyraldehyde aldoxime, and X is hydrogen or an inorganic salt-forming group. Particularly useful are compounds in which R and R' are hydrogen or alkyl radicals of up to 2 carbons each.

The particular amino radical generated in situ will depend directly on the hydroxylamino compound used in the reaction and the particular amine obtained by the reaction will depend upon the amino radical and the unsaturated compound employed. The amino compounds obtained generally will have at least one amino group,

attached to carbon of the unsaturated compound employed. When a diene such as butadiene is employed, the product obtained is a diamine of the structure

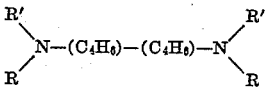

wherein $(C_4H_6)$ represents the diene unit such as $(-CH_2-CH=CH-CH_2-)$ or its isomer 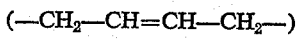 $(-CH_2-CH[CH=CH_2]-)$.

The quantity of hydroxylamino compound and of the metallic reducing ion employed can be varied within wide limits. One molecular equivalent of reducing ion reacts with one equivalent of hydroxylamino compound to produce an amino radical. Accordingly, the molar ratio of hydroxylamino compound to the effective ratio of metallic reducing ion generally varies within the limits of 0.75 to 1.5 of one to the other. Normally the quantity of unsaturated compound present depends upon the extent of amination desired. This is usually one amino group per molecule of compound containing at least one carbon-to-carbon double bond. However, when introduction of more than one amino group per molecule, e.g., of an aromatic is desired, the relative concentration of unsaturated compound should be less than the molar amount of amino radical being generated.

The external conditions, such as temperature, pressure and time, are not critical factors in the reaction. The actual temperature will generally vary from −30 to 100° C. Normally atmospheric pressure is employed. The reaction time will be dependent upon the rate of introduction or formation of amino radicals. The pH of the reaction medium will be on the acid side, since formic, acetic or halogenated acetic acids are employed as the solvents. The particular metallic reducing ion may cause variation in the exact pH. In some cases, mineral acid can be and preferably is present to further lower the pH to less than 2. Low pH is generally advantageous in preventing the precipitation of inorganic ions formed in production of amino radicals.

The amines obtained by the process of this reaction are generally isolated by an extraction or distillation technique or by a combination of these methods. Sometimes filtration is used to remove some of the inorganic salts, particularly under basic conditions.

The products obtained by the process of this invention have many useful applications. Thus the aromatic amines are useful as intermediates in dyestuff preparation, e.g., aniline and toluidine mixtures on oxidation give fuchsine. Aliphatic diamines are particularly useful for the preparation of polyamides by condensation with dibasic acids, e.g., a fiber forming polymer is obtained by the condensation of adipic acid with the $C_8$ diamine of Example V. Aliphatic monoamines, such as the butylamine of Example IX, can be reacted to form sulfonamides which are useful as plasticizers.

Since many different embodiments of the invention may be made without departing from the spirit and scope thereof, it is to be understood that the invention is not limited by the specific illustrations except to the extent defined in the following claims.

What is claimed is:

1. In a process for preparing organic amines by reacting in an aqueous medium an organic compound, of 2 to 9 carbon atoms selected from the group consisting of aliphatic polymerizable ethylenically unsaturated hydrocarbons, cycloaliphatic ethylenically unsaturated hydrocarbons, aromatic hydrocarbons and tetramethylethylene, with amino radicals generated in situ by the action of a metallic reducing ion selected from the group consisting of $Ti^{+++}$, $V^{++}$, $V^{+++}$, $Cr^{++}$ and $Mo^{+++}$ on a hydroxylamino compound of the formula

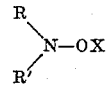

wherein R and R' are selected from the group consisting of hydrogen, methyl, ethyl, benzyl and a divalent saturated hydrocarbon radical wherein both free valences emanate from the same carbon when R and R' are taken together and X is a member of the group consisting of hydrogen and inorganic salt forming groups, the method for improving the yields of organic amines which comprises conducting the reaction in an aqueous medium containing per part of water by weight, 0.5 to 10 parts of an acid selected from the group consisting of formic, acetic, fluoroacetic and chloroacetic acids, and isolating the resulting amine.

2. A process as defined in claim 1 wherein the aqueous medium contains from 1 to 2 parts of said acid per part of water by weight.

3. A process as defined in claim 1 wherein in addition to said acid, mineral acid is present and the aqueous medium has a pH of less than 2.

4. A process as defined in claim 1 wherein said organic compound of 2 to 9 carbon atoms is an aliphatic polymerizable ethylenically unsaturated hydrocarbon.

5. A process as defined in claim 1 wherein said metallic reducing ion is $Ti^{+++}$.

6. A process as defined in claim 1 wherein said metallic reducing ion is $V^{+++}$.

References Cited in the file of this patent

UNITED STATES PATENTS

| | | |
|---|---|---|
| 1,423,494 | Haas | July 18, 1922 |
| 1,989,325 | Lommel et al. | Jan. 29, 1935 |
| 2,585,355 | Turski | Feb. 12, 1952 |
| 2,683,140 | Howard | July 6, 1954 |

OTHER REFERENCES

Davis et al.: J. of the Chemical Society, No. 3 (1951), pp. 2563–2567.